US009085302B2

(12) United States Patent
Borroni-Bird et al.

(10) Patent No.: US 9,085,302 B2
(45) Date of Patent: Jul. 21, 2015

(54) MODULAR ROBOTIC VEHICLE

(71) Applicants: GM GLOBAL TECHNOLOGY OPERATIONS LLC, Detroit, MI (US); The U.S.A. As Represented by the National Aeronautics and Space Administration, Washington, DC (US)

(72) Inventors: Christopher E. Borroni-Bird, Oakland Township, MI (US); Robert L. Vitale, Macomb Township, MI (US); Chunhao J. Lee, Troy, MI (US); Robert O. Ambrose, Houston, TX (US); William J. Bluethmann, Houston, TX (US); Lucien Q. Junkin, Houston, TX (US); Jonathan J. Lutz, League City, TX (US); Raymond Guo, Seabrook, TX (US); Anthony Joseph Lapp, Houston, TX (US); Justin S. Ridley, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 130 days.

(21) Appl. No.: 14/032,473

(22) Filed: Sep. 20, 2013

(65) Prior Publication Data

US 2015/0083509 A1    Mar. 26, 2015

(51) Int. Cl.
*B60W 10/00* (2006.01)
*B60W 30/18* (2012.01)
(Continued)

(52) U.S. Cl.
CPC ........ *B60W 30/18009* (2013.01); *B60K 7/0007* (2013.01); *B60T 13/74* (2013.01);
(Continued)

(58) Field of Classification Search
CPC ............... B60K 7/0007; B60K 1/04; B60K 2007/0038; B60G 2300/50; B60G 2200/144; B60W 10/20; B60W 10/192
USPC ........ 180/65.1, 65.51, 291, 65.265; 310/67 R
See application file for complete search history.

(56) References Cited

U.S. PATENT DOCUMENTS

| 2,039,513 A | * | 5/1936 | Baker | 180/65.51 |
| 3,937,293 A | * | 2/1976 | Susdorf | 180/65.6 |

(Continued)

OTHER PUBLICATIONS

Green Car Congress, Energy, Technologies, issues and policies for sustainable mobility; Apr. 26, 2013, 2004-2013 Green Car Congress.

*Primary Examiner* — Brodie Follman
(74) *Attorney, Agent, or Firm* — Quinn Law Group, PLLC (57) ABSTRACT

A modular robotic vehicle includes a chassis, driver input devices, an energy storage system (ESS), a power electronics module (PEM), modular electronic assemblies (eModules) connected to the ESS via the PEM, one or more master controllers, and various embedded controllers. Each eModule includes a drive wheel containing a propulsion-braking module, and a housing containing propulsion and braking control assemblies with respective embedded propulsion and brake controllers, and a mounting bracket covering a steering control assembly with embedded steering controllers. The master controller, which is in communication with each eModule and with the driver input devices, communicates with and independently controls each eModule, by-wire, via the embedded controllers to establish a desired operating mode. Modes may include a two-wheel, four-wheel, diamond, and omni-directional steering modes as well as a park mode. A bumper may enable docking with another vehicle, with shared control over the eModules of the vehicles.

18 Claims, 4 Drawing Sheets

(51) Int. Cl.
  *B60K 7/00* (2006.01)
  *B60T 13/74* (2006.01)
  *B62D 5/04* (2006.01)
  *B60W 10/08* (2006.01)
  *B60W 10/20* (2006.01)
  *B60W 10/192* (2012.01)

(52) U.S. Cl.
  CPC ............ *B60W 10/08* (2013.01); *B60W 10/192* (2013.01); *B60W 10/20* (2013.01); *B62D 5/0418* (2013.01); *B60K 2007/0038* (2013.01)

(56) References Cited

U.S. PATENT DOCUMENTS

| | | | |
|---|---|---|---|
| 4,913,258 A * | 4/1990 | Sakurai et al. | 180/242 |
| 5,058,016 A * | 10/1991 | Davidovitch | 701/22 |
| 6,260,645 B1 * | 7/2001 | Pawlowski et al. | 180/65.22 |
| 6,424,900 B2 * | 7/2002 | Murray et al. | 701/48 |
| 6,590,306 B2 * | 7/2003 | Terada | 310/75 C |
| 7,398,846 B2 * | 7/2008 | Young et al. | 180/65.51 |
| 7,597,169 B2 * | 10/2009 | Borroni-Bird et al. | 180/253 |
| 7,849,945 B2 * | 12/2010 | Ross et al. | 180/65.51 |
| 8,556,012 B2 * | 10/2013 | Kim | 180/65.51 |
| 8,561,735 B2 * | 10/2013 | Morrow et al. | 180/65.1 |
| 8,684,115 B2 * | 4/2014 | Bryant | 180/65.51 |
| 2003/0127272 A1 * | 7/2003 | Baker et al. | 180/326 |
| 2003/0132584 A1 * | 7/2003 | Borroni-Bird et al. | 280/5.5 |
| 2003/0159866 A1 * | 8/2003 | Claypole et al. | 180/65.5 |
| 2007/0199748 A1 * | 8/2007 | Ross et al. | 180/65.5 |
| 2010/0025131 A1 * | 2/2010 | Gloceri et al. | 180/65.28 |
| 2014/0375011 A1 * | 12/2014 | Lee | 280/124.13 |

* cited by examiner

MODULAR ROBOTIC VEHICLE

STATEMENT REGARDING FEDERALLY SPONSORED RESEARCH OR DEVELOPMENT

This invention was made with government support under NASA Space Act Agreement number SAA-EA-10-017. The invention described herein may be manufactured and used by or for the U.S. Government for U.S. Government (i.e., non-commercial) purposes without the payment of royalties thereon or therefor.

TECHNICAL FIELD

The present disclosure is related to a modular robotic vehicle.

BACKGROUND

An ideal vehicle design for a driver who is commuting within a congested area might be a relatively small, fuel efficient vehicle that is easy to maneuver and park. However, on other occasions, the same driver may wish to transport multiple passengers and/or cargo, or may wish to operate in different drive modes. For such a driver, a conventional vehicle chassis and powertrain, having a fixed configuration and mechanically coupled steering, braking, and propulsion systems, may be less than optimal.

SUMMARY

A modular robotic vehicle is disclosed herein. The vehicle has a flexible design that is intended to address some of the concerns noted above. The present design is characterized by an absence of a central powerplant, transmission, fuel tank, and direct mechanical linkages between various driver input devices and the actuators used for accomplishing a driver's desired propulsion, braking, and/or steering actions. By distributing these core vehicle functions, e.g., at the corners of the vehicle or offset therefrom, in a modular electric corner assembly or "eModule" and using by-wire control, substantial space and weight may be saved relative to conventional designs. Moreover, the functional capabilities that are provided by the individual eModules enable control of the vehicle in a variety of different operating modes, some of which are not possible with front wheel-steered vehicles having conventional powerplants. A vehicle may have just one fully-functional eModule, or it may have two or more. Some of the wheels may lack some of the functionality of the fully-functional eModule in an alternative embodiment, e.g., propulsion, such that some wheels are pulled along passively by other wheels.

The vehicle disclosed herein has a reconfigurable platform that is driven in response to by-wire commands using electrical energy supplied by a high-voltage energy storage system (ESS) and an associated power electronics module (PEM). Motion control is provided by a distributed control network having a master controller and multiple "embedded" local controllers, i.e., positioned within the structure of the eModule in proximity to the particular vehicle function being controlled. Each embedded controller has a corresponding steering, propulsion, or braking task for a given wheel or corner of the vehicle. Multiple levels of control redundancy are provided, with a plurality of controllers used for operationally designated functions such as the master controller functions and steering. Additionally, a wide spectrum of possible operating modes is enabled by the present design. Such operating modes may include two-wheel, four-wheel, diamond, and omni-directional or "crab" steering modes, as well as a park mode, all of which are described herein.

Additionally, each eModule houses individual steering, propulsion, braking, and suspension systems. Independent control of each eModule is supervised by the master controller and backed up by a redundant secondary master controller, with various embedded controllers communicating as needed with the master controller(s) via Ethernet for Control Automation Technology (EtherCAT) or another suitable high-speed connection.

Driver input commands are transmitted from various driver input devices by-wire and received by the master controller(s). The driver input devices may include a brake pedal, an accelerator pedal, a human machine interface (HMI) screen, and a steering wheel, with a joystick optionally replacing some or all of these devices. The master controller, upon receipt and processing of the by-wire input commands, issues individual by-wire commands to each of the embedded controllers. The entire control operation is achieved by-wire as noted above, i.e., without direct mechanical linkages between the driver input devices and the steering, propulsion, or braking subsystems being controlled in response to the driver's inputs commands.

Vehicle-to-vehicle docking capabilities are also provided in an optional embodiment. Such docking capabilities may allow multiple similarly configured vehicles to engage in a series or daisy-chain configuration using specially configured bumper, or wirelessly without mutual contact in another embodiment. Once docked, the vehicles are able to exchange or share control data and electrical power as needed. The docked vehicle concept as disclosed herein may allow a driver to enjoy an extended travel range and expanded cargo/passenger capacity when desired, as well as coordinated power system management functionality. For instance, a lead vehicle in a chain of linked vehicles may assume all control functions of the trailing vehicles, such that a driver of the lead vehicle provides all steering, braking, acceleration commands and drive mode selections. In such a configuration, the various motors of the trailing vehicle(s), particularly those housed within the eModules, can be used to generate electricity for extending the overall range of the linked vehicles.

Each eModule may include or may be connectable to a drive wheel containing a propulsion-braking module, with the propulsion-braking module including a wheel motor and an electric motor-actuated brake. Each eModule may also house a steering control assembly and a suspension system. The master controller, which is in communication with each eModule and with the various driver input devices, is programmed to communicate with and independently control the eModules by-wire. In this manner, the various modular eModules can be used to selectively establish a desired operating mode.

The above features and advantages and other features and advantages of the present teachings are readily apparent from the following detailed description of the best modes for carrying out the present teachings when taken in connection with the accompanying drawings.

DETAILED DESCRIPTION

Figure 1:
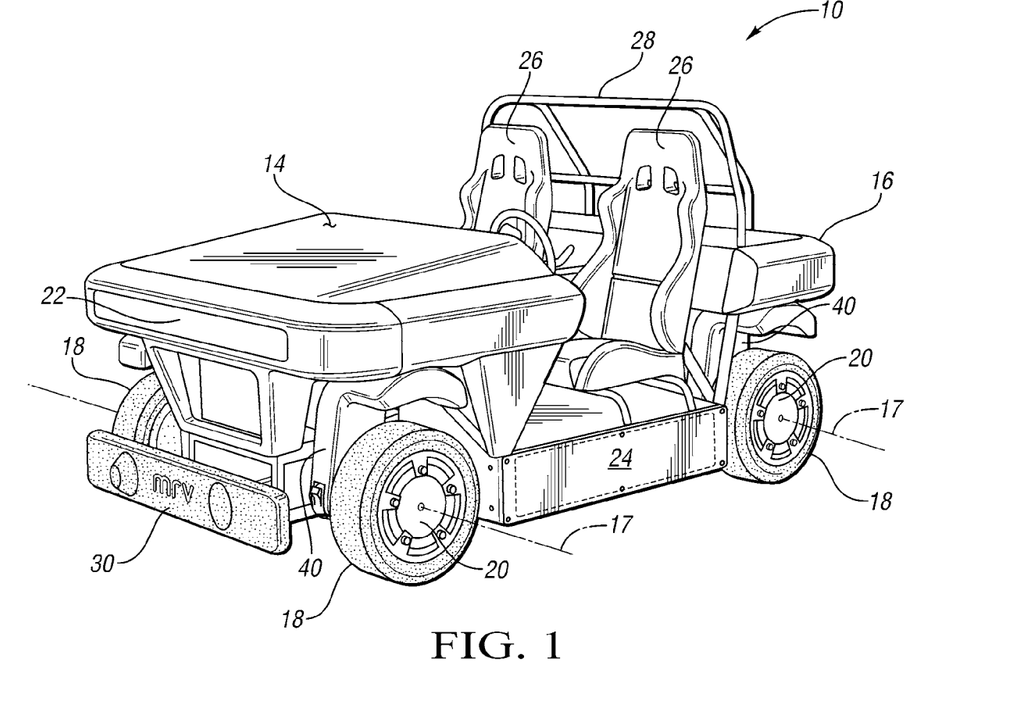
FIG. 1 is a schematic perspective side view illustration of an example modular robotic vehicle.
Figure 2:
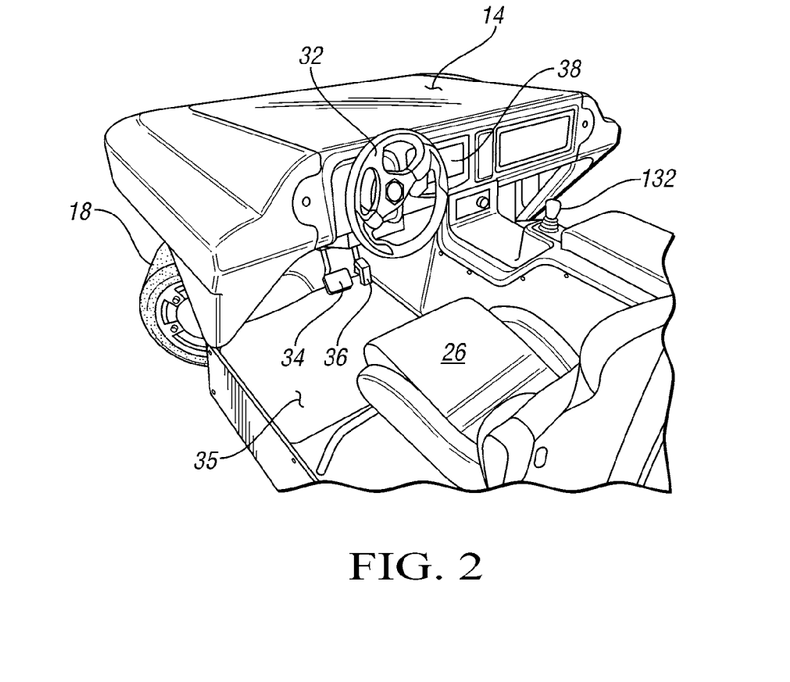
FIG. 2 is a schematic perspective top view illustration of the modular robotic vehicle shown in FIG. 1.
Figure 3:
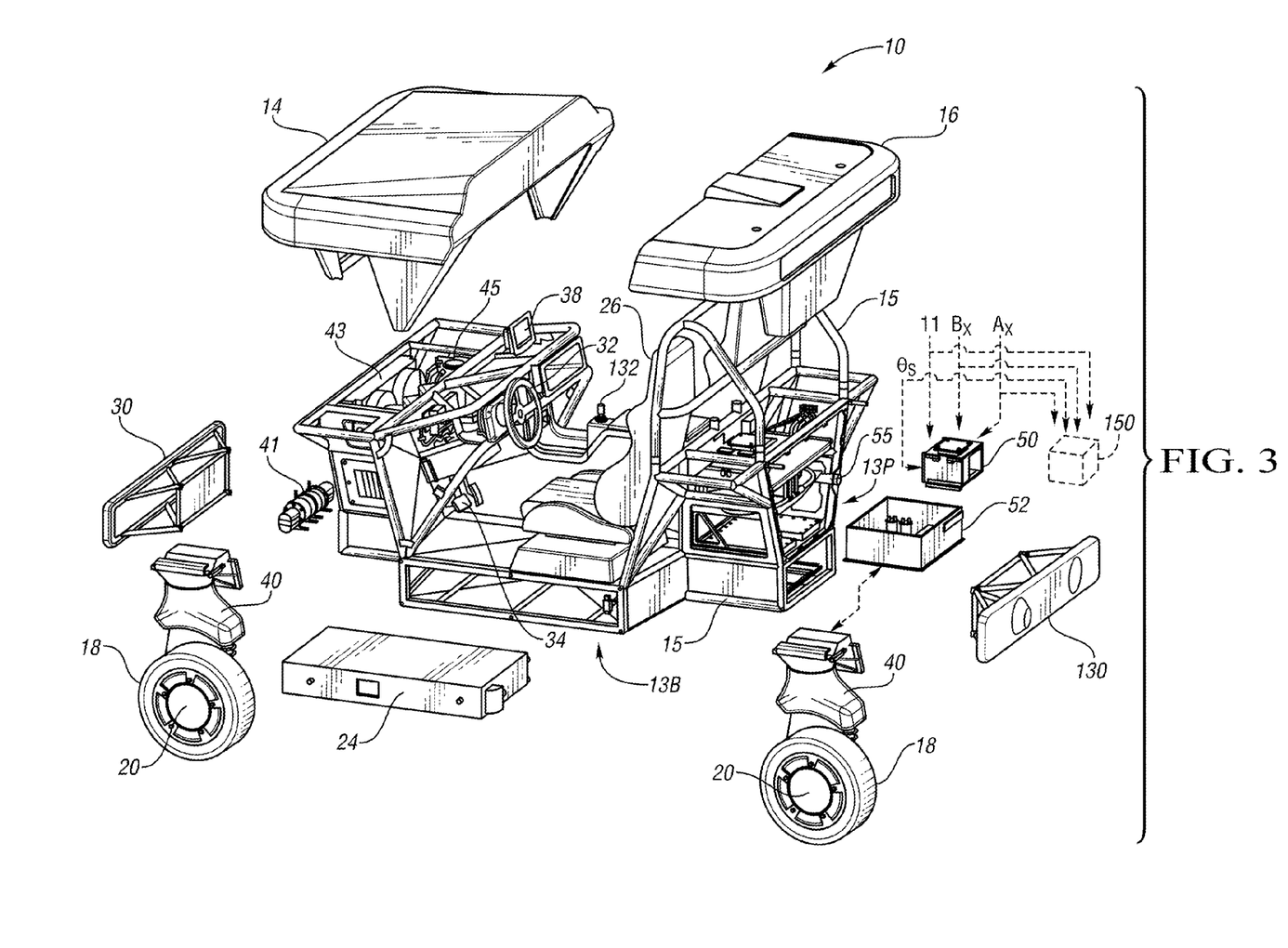
FIG. 3 is a schematic exploded view illustration of the modular robotic vehicle shown in FIGS. 1 and 2.

Referring to the drawings, wherein like reference numbers refer to like components throughout the several Figures, an example modular robotic vehicle 10 is shown schematically in FIGS. 1-3. The term "modular" as used herein refers to the modularity of design of the vehicle 10 as a whole, i.e., with the vehicle 10 being divided into multiple independently and/or interdependently controlled electromechanical subsystems, each of which can be disconnected from or connected to the vehicle 10 as needed to establish a desired functional drive configuration. The vehicle 10 may be any rectangular, triangular, polygon-shaped, pod-shaped, or circular vehicle, used conventionally on roads or highways or in alternative configurations such as a go-kart, an amusement park ride or vehicle, a remote controlled vehicle, a neighborhood vehicle, a golf cart, a maintenance vehicle such as a lawn tractor or mower, a logistical vehicle for use in a plant environment, etc.

A particular modular component providing a foundation to the design set forth herein is a modular electric assembly or "eModule" 40, with eModules 40 being distributed about the vehicle 10, for instance at each corner of a conventional chassis, offset from the corners, or arranged around a circular chassis, e.g., for an amusement park ride or a circular vehicle as noted above. An example four-wheel design as shown in FIG. 1 has four corners, and thus four eModules 40. Some of the eModules 40, however, may lack all of the described structure and functionality in other embodiments, e.g., with propulsion, steering, and/or braking lacking in some wheels, for instance in two of the wheels of a conventional four-corner vehicle. The basic design and functionality of the eModules 40 is described in further detail below with reference to FIGS. 4 and 5. The eModules 40, as with all components of the vehicle 10, are driven via electrical power from a high-voltage energy storage system (ESS) 24 and an onboard power electronics module (PEM) 52, with the latter shown in FIG. 3. Overall control supervision is provided via a master controller 50 as shown in FIG. 3, with the master controller 50 backed up by a secondary master controller 150 as shown in the same Figure.

Referring briefly to FIG. 3, each of the master controller 50 and secondary master controller 150 may be embodied as a microprocessor-based computer device having sufficient amounts of tangible, non-transitory memory, e.g., read only memory (ROM), as well as transitory memory such as random access memory (RAM), electrically-programmable read-only memory (EPROM), etc. The master controller 50 may also include logic circuitry including but not limited to proportional-integral-derivative (PID) control logic, a high-speed clock, analog-to-digital (A/D) circuitry, digital-to-analog (D/A) circuitry, digital signal processor hardware, and any necessary input/output (I/O) devices and other signal conditioning and/or buffer circuitry. Control functions described herein may be recorded in computer-readable formats in a location accessible by the master controllers 50, 150 and executed from such memory in response to changing driver inputs and other conditions such as vehicle speed, battery state of charge, and the like.

Referring again to FIG. 1, the vehicle 10 of FIG. 1 also includes a chassis 12 to which is attached front and rear body shells 14 and 16, respectively. The chassis 12 may be formed from a lattice of interconnected tubular frame pieces, e.g., steel, aluminum, or fiberglass tubing. The structure of the chassis 12 can also be used to help secure the eModules 40 to the chassis 12, with an example of such structure being described in more detail below with reference to FIG. 5. An optional vehicle-to-vehicle docking function is enabled via the example design of FIG. 6.

Further with respect to FIG. 1, the vehicle 10 includes a set of drive wheels 18. Each drive wheel 18 is individually powered by a corresponding propulsion-braking module 20 contained within a hub or center structure of the drive wheel 18. The propulsion-braking module 20 rotatably supports the wheel rim (not shown) for rotation about a wheel axis 17. While omitted from the various Figures for illustrative simplicity, the propulsion-braking module 20 includes an electric wheel motor having a rotor which rotates with respect to the wheel axis 17. A stator of such a motor may be disposed radially inside of the rotor relative to the wheel axis 17. A brake drum may be used with a pair of diametrically-opposed brake shoes, each of which includes a friction surface that is operable to engage a radial inner surface of the brake drum. An electric brake motor, also omitted from the Figures, may be used to move the brake shoes into engaged with the drum when braking is commanded by a driver of the vehicle 10. A propulsion controller 50P and a brake controller 50B are used at each eModule 40 to independently control the respective propulsion and braking functions at the various eModules 40, with possible relative placement of the controller 50P and 50B shown schematically in FIG. 4.

The vehicle 10 of FIG. 1 may also include any necessary vehicle accessory features such as a headlamp 22, the ESS 24, seats 26, and an optional overhead bar 28 or other overhead support structure such as a canopy (not shown). A bumper 30 is positioned at the front and rear of the vehicle 10. The bumper 30 may be constructed of impact-resistant plastic, rubber, or another suitable material and connected to the chassis 12 with flexible mounts, which are best shown at 90 and 190 in FIG. 6.

Referring to FIG. 2, the vehicle 10 is controlled via driver commands as received by multiple driver interface devices. These devices collectively determine a driver's desired control response, and in turn provide associated control signals to the master controller 50 shown schematically in FIG. 3, for the purpose of establishing reliable, fault-tolerant by-wire control of all steering, propulsion, and braking functions. The noted driver interface devices may include a steering input device, shown here as a conventional steering wheel 32 and an optional joystick 132, an accelerator pedal 34, a brake pedal 36, and a human-machine interface (HMI) screen 38, e.g., a touch screen which receives a driver's preferred operating mode or other input commands. Other driver interface devices may be envisioned without departing from the intended inventive scope. In some embodiments, the functions of the steering wheel 32 as well as that of the pedals 34 and 36 may be performed solely via the joystick 132.

While the size of the vehicle 10 can be scaled as needed, a compact envelope may be ideal when the vehicle 10 is to be used in congested urban environments or other situations in which driving and/or parking space may be limited. For instance, the vehicle 10 of FIGS. 1 and 2 may have a length of about 2.5 m, a height and width each of about 1.5 m, and a ground clearance of less than about 0.15 m. Such a design, with eModules 40 each having a mass of about 80 kg, would provide a relatively low curb mass of under 900 kg. While this particular set of specifications is merely illustrative, the intent of the design as set forth herein is a vehicle having a reduced envelope and curb weight relative to conventional electric and hybrid vehicles.

Referring once again to FIG. 3, the vehicle 10 is shown in exploded view to illustrate some of the modules and associated components noted above. Sensors (not shown) may be positioned with respect to the accelerator and brake pedals 34 and 36, respectively, and used to measure the amount of travel and/or force as corresponding accelerator pedal signals ($A_X$) and brake pedal signals ($B_X$). Similarly, a steering angle sensor may be positioned with respect to the steering input device 32 and used to measure the desired steering angle ($\theta_S$). Calculated changes in the measured steering angle over time can determine the steering rate ($\omega_S$), or this value may be directly measured. Other control inputs (arrow 11) from the HMI screen 38 such as a selected drive/steering mode and/or heating, ventilation, and air conditioning (HVAC) settings, etc., as well as the various signals $A_X$, $B_X$, $\theta_S$, and $\omega_S$, are communicated to the master controller 50, which ultimately coordinates all control actions aboard the vehicle 10. For functional redundancy, the secondary master controller 150 may be used in conjunction with the master controller 50, with the secondary master controller 150 receiving the same set of signals. In the event of an unexpected logic fault, for instance, the secondary master controller 150 can continue to provide the core control functionality over the vehicle 10.

The respective front and rear body shells 14 and 16 in the example configuration shown in FIG. 3 may be constructed from impact-resistant plastic, lightweight aluminum, fiberglass, or conventional sheet metal. The body shells 14 and 16 may be contoured to drape over the chassis 12 and cover the tubular frame pieces 15, with the body shells 14 and 16 protecting and concealing the underlying electronic and fluid control hardware. Construction of the body shells 14 and 16 using reduced weight materials may help to extend the range of the vehicle 10.

The chassis 12 may define multiple cavities within which the various modules are received and stowed. For example, the ESS 24 may be inserted below a floor 35 into a battery cavity 13B. Similarly, the PEM 52 may be received in a power module cavity 13P. Other subsystems or modules may include a coolant pump 41 for circulating coolant from a coolant reservoir 45 to a radiator 43, and/or to each of the eModules 40 for cooling of motor components located therein, all of which may be housed beneath the front body shell 14.

With respect to propulsion of the vehicle 10 of FIGS. 1-3, all energy needed for this function is supplied by the ESS 24, which may be connected to an offboard power supply via a charging port 55 for rapid recharging of the ESS 24. Thus, the vehicle 10 of FIGS. 1-3 is a battery electric vehicle (BEV) controlled by-wire as noted above, with all available drive and steering modes being electric vehicle (EV) mode variants.

The ESS 24 may be constructed as a high-voltage, multi-cell DC energy storage device, for example a rechargeable solid-cell lithium ion battery having a voltage rating of about 300 VDC to 400 VDC, with 360 VDC being a typical high-voltage rating. In addition to the various cells and connectors of the DC battery, the ESS 24 may include power management circuitry and logic of the type used for balancing and managing the state of charge of the cells, thermal management components, and the like. The PEM 52 in turn may include the necessary solid state hardware for controlling and converting the flow of electrical power to and from the ESS 24 aboard the vehicle 10.

In some embodiments, the PEM 52 may perform a centralized power management role, wherein all AC-to-DC and DC-to-AC conversion occurs. In such an embodiment, VAC can be delivered to each of the eModules 40, e.g., via an AC power bus, and lower voltage/auxiliary DC power can be delivered to the eModules 40 via an auxiliary power bus, for instance to power the various embedded controllers 50P, 50B, 50S. In other embodiments, each eModule 40 may receive high and low DC voltages from the PEM 52 as needed, e.g., over respective HVDC and LVDC buses, with all DC-to-AC and AC-to-DC conversion occurring locally within the eModules 40.

As is well understood in the art, power electronics hardware typically includes a power switching module having multiple semiconductor switches, i.e., MOSFETs or IGBTs, which are suitable for converting DC power, for instance from the ESS 24, to AC power suitable for driving any AC-powered devices. Such AC devices may include any motors positioned within the eModules 40 or other motors used elsewhere in the vehicle 10, e.g., for pumping cooling or hydraulic fluid. Thus, semiconductor switches may be positioned within the eModules 40 to convert power from DC to multi-phase and vice versa as needed in some embodiment, or the PEM 52 may do so centrally, without departing from the intended inventive scope.

The PEM 52 may also include a voltage regulator, a DC-to-DC converter for providing auxiliary low-voltage power aboard the vehicle 10, power conditioning/filtering hardware, and the like. For any DC devices, such as any processors, logic chips, fans, memory devices, and the like of the various controllers 50B, 50P, 50S, the PEM 52 may reduce DC voltage from the ESS 24 to suitable decreased or increased levels. In some embodiments, the PEM 52 or local semiconductor switches within the eModules 40 may also perform the reverse AC-to-DC conversion as needed, e.g., for charging the ESS 24 in a regenerative braking event.

The ESS 24 and the PEM 52 may provide, according to a possible embodiment, to handle an electrical load of 1.5 kW for all non-propulsion power usage aboard the vehicle 10. In the same embodiment, the ESS 24 and the PEM 52 may be capable of achieving an EV range of at least 100 km and a top speed of 40 kph or more, with accelerations of between 0.3 G in steady state operation to −1 G (deceleration) for rapid braking Optional regenerative braking may be used in some designs to help achieve this desired range. Uses in this configuration could extend to warehouse or manufacturing facility transportation or logistics, urban commuting, low-speed roving/exploration, and the like.

Figure 4:
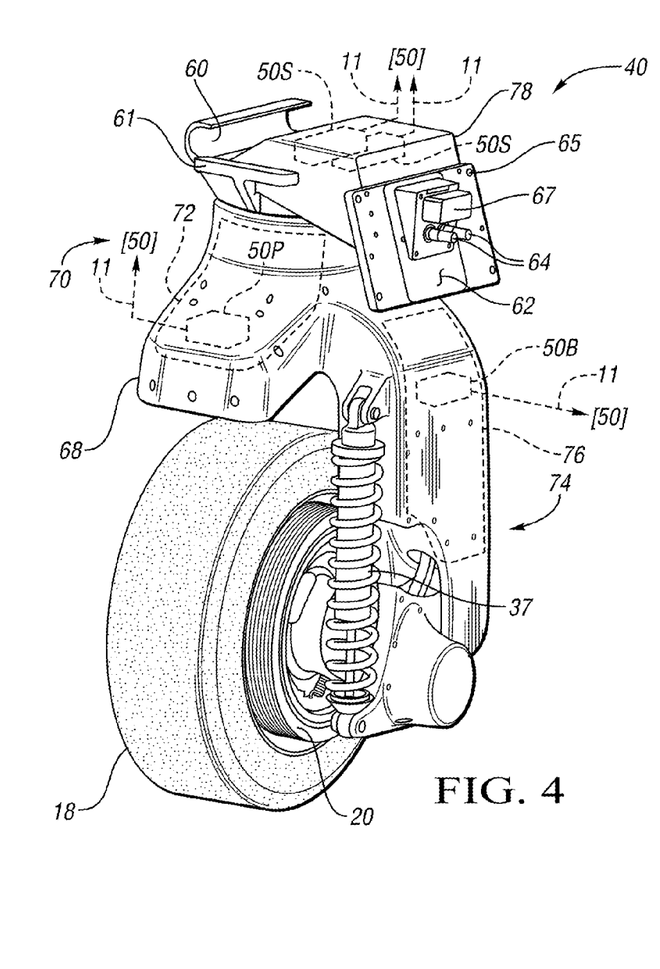
FIG. 4 is a schematic perspective side view illustration of an example eModule usable with the modular robotic vehicle shown in FIGS. 1-3.

Referring to FIG. 4, the eModule 40 is configured to house all of the embedded controllers used for control of a particular corner of the vehicle 10, i.e., the propulsion controller 50P, the steering controllers 50S, and the brake controller 50B. To serve this function, the eModule 40 may be provided with a housing 68 having an upper portion 70 and a lower portion 74. The upper portion 70 may contain a propulsion control assembly 72 containing a propulsion controller 50P, while the lower portion 74 may contain a braking control assembly 76. A suspension system is also positioned adjacent to the lower portion in proximity to the propulsion-braking module 20, with a spring-damper assembly 37 of such a suspension system visible from the perspective of FIG. 4. The spring-damper assembly 37 may be a passive, semi-active, or fully active suspension unit. The internal structure of the propulsion control assembly 72 and the braking control assembly 76 are omitted for illustrative simplicity.

The steering controllers 50S are positioned with respect to the upper portion 70 to locally control the steering function of the eModule 40. Two steering controllers 50S as shown may be used to provide functional redundancy over all steering functions. The suspension system, most of which is not shown, includes the spring-damper assembly 37 and is housed within and/or connected to the lower portion 74. Such a suspension system may contain any electronics such as wiring and joint angle encoders (not shown) needed for measuring and communicating information pertaining to the orientation of the drive wheel 18 with respect to the pivot axis 19 (see FIG. 5). The steering and propulsion controllers 50S and 50P, respectively, are in communication with the master controller 50 shown in FIG. 3, and are programmed and equipped in hardware to perform local tasks in response to instructions from the master controller 50, as well as from the secondary master controller 150 of FIG. 3 if the vehicle 10 is so equipped.

A steering motor, encoders, and other associated hardware (not shown) for a given eModule 40 may be housed in and covered by an upper mounting bracket assembly 78 along with the two steering controllers 50S, and configured to properly encode the position and rotational speed of a steering joint within the eModule 40, as well as to amplify steering torque from such a steering motor, e.g., through a gear set (not shown). As will be appreciated by those having ordinary skill in the art, such embedded controllers may include printed circuit board assemblies (PCBAs) having local task execution responsibility for the eModule 40 within which the PCBA is embedded, with instructions received from the master controller 50 of FIG. 3. The various PCBAs embodying the individual embedded controllers 50P, 50B, and 50S may include a microprocessor, tangible, non-transitory and transitory memory, transceivers, cooling plates, and the like, and programmed to perform specific tasks locally with respect to the eModule 40.

The housing 68 shown in FIG. 4 may be constructed of aluminum or another suitable sheet metal material, or of impact-resistant plastic or fiberglass. The housing 68 provides a durable outer cover over the sensitive electrical and mechanical components housed therein. The upper mounting bracket assembly 78 facilitates connection and disconnection of the eModule 40 to and from the chassis 12 of FIG. 3, with the connection illustrated in FIG. 5. The upper mounting bracket assembly 78 also houses the steering controllers 50P as shown, with each steering controller 50P in communication with the master controller 50 and the secondary controller 150 via control signals (double-headed arrows 11).

Figure 5:
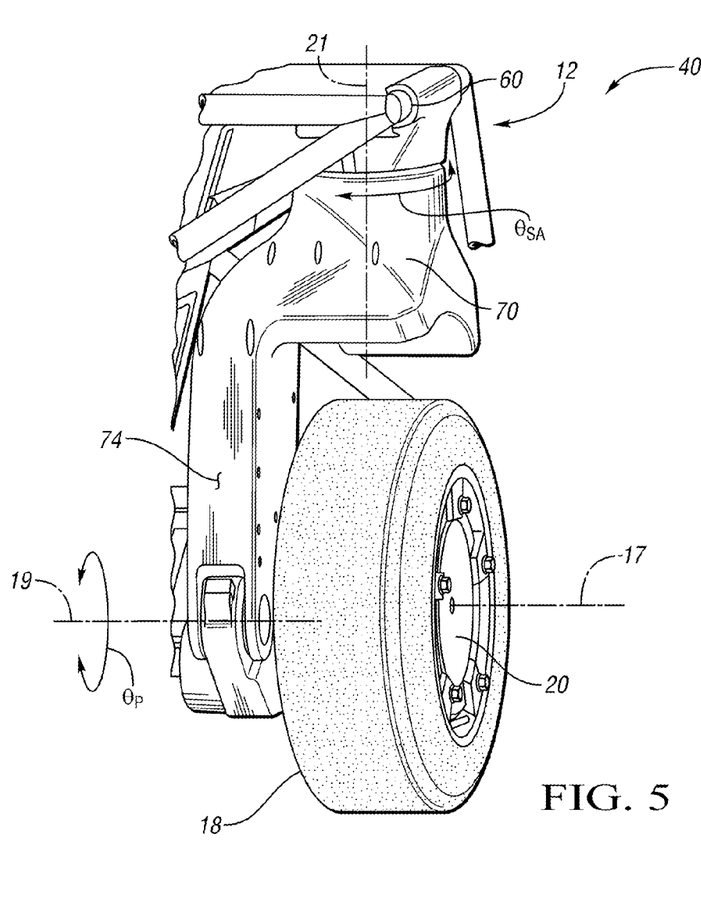
FIG. 5 is a schematic perspective front view illustration of the eModule of FIG. 4 in an installed position.

To facilitate mounting of the eModule 40 to the chassis 12, the upper mounting bracket assembly 78 may also include an elongated C-shaped mounting hook 60 configured to receive a tubular cross piece 15 of the chassis 12 as shown in FIG. 5, and to thereby help orient and hang the eModule 40. The eModule 40 is then bolted via the mounting bracket assembly 78 to the chassis 12. To that end, a rectangular top flange 61 may be used which includes bolt holes (not shown) for securing the eModule 40 to the chassis 12 at that particular location.

The upper mounting bracket assembly 78 shown in FIG. 4 may also include an angled bracket 62 positioned opposite to and sloping away from the elongated mounting hook 60. The angled bracket 62 may frame and support a set of fluid input/output connectors 64 and electrical/data connectors 67, which protrude from the angled bracket 62. Such structure may facilitate connection of the eModule 40 to available power flow, data links, and cooling fluid housed within the vehicle 10.

As with the top flange 61, the angled bracket 62 may define a series of bolt holes 65 for securing the eModule 40 to the chassis 12 at this additional location. The angled bracket 62 of FIG. 4 mates up with an angled mounting panel (not shown) of the chassis 12 in this position. Thus, modular installation of the eModule 40 works by positioning the elongated mounting hook 60 over a tubular frame piece 15, hanging the eModule 40 via the elongated mounting hook 60, and then completing the mechanical mounting using bolts at the top flange 61 and angled bracket 62. Thereafter, fluid power, electrical power, and data communications to the eModule 40 are connected at the electrical power/data port 63.

The eModule 40 is shown in an installed position in FIG. 5, with the three axes of the eModule 40 represented as the wheel axis 17, a pivot axis 19, and a steering axis 21. The drive wheel 18 rotates with respect to the wheel axis 17 as noted above, while a mounted eModule 40 rotates through an actual steering angle range indicated by double-headed arrow $\theta_{SA}$. The driver wheel 18 pivots as needed with respect to the pivot axis 19 to help absorb shock and road vibration.

Use of the modular, independently-controlled eModule 40 of FIGS. 4 and 5 enables different steering or drive modes, including two-wheel, four-wheel, diamond, and omni-directional steering modes, as well as a park mode. Two-wheel and four-wheel steering enable steering via two or four of the eModules 40, respectively. Diamond steering is a particular four-wheel steering mode in which the drive wheels 18 are positioned such that their respective axes 17 all pass through a center point of the vehicle 10. Propulsion in this particular mode would cause the vehicle 10 of FIG. 1 to rotate in place around its vertical axis, as will be appreciated by one having ordinary skill in the art.

Omni-directional steering places all of the drive wheels 18 at or near the same angle with respect to a longitudinal axis of the vehicle 10, i.e., the front-to-back length, such that the drive wheels 18 are all facing in the same direction. This enables a "crab mode" driving maneuver wherein the vehicle 10 can move at an angle with respect to its longitudinal axis, including at right angles. Such a mode might facilitate difficult parking maneuvers, particularly parallel parking into a tight parking space. Park mode places the front and rear drive wheels 18 located on the same lateral side of the vehicle, such the front and rear right side, are at the same angle. Thus, in park mode the two front drive wheels 18 and the two rear drive wheels 18 would point outward with respect to the longitudinal axis of the vehicle 10, thereby preventing any forward or reverse motion.

Figure 6:
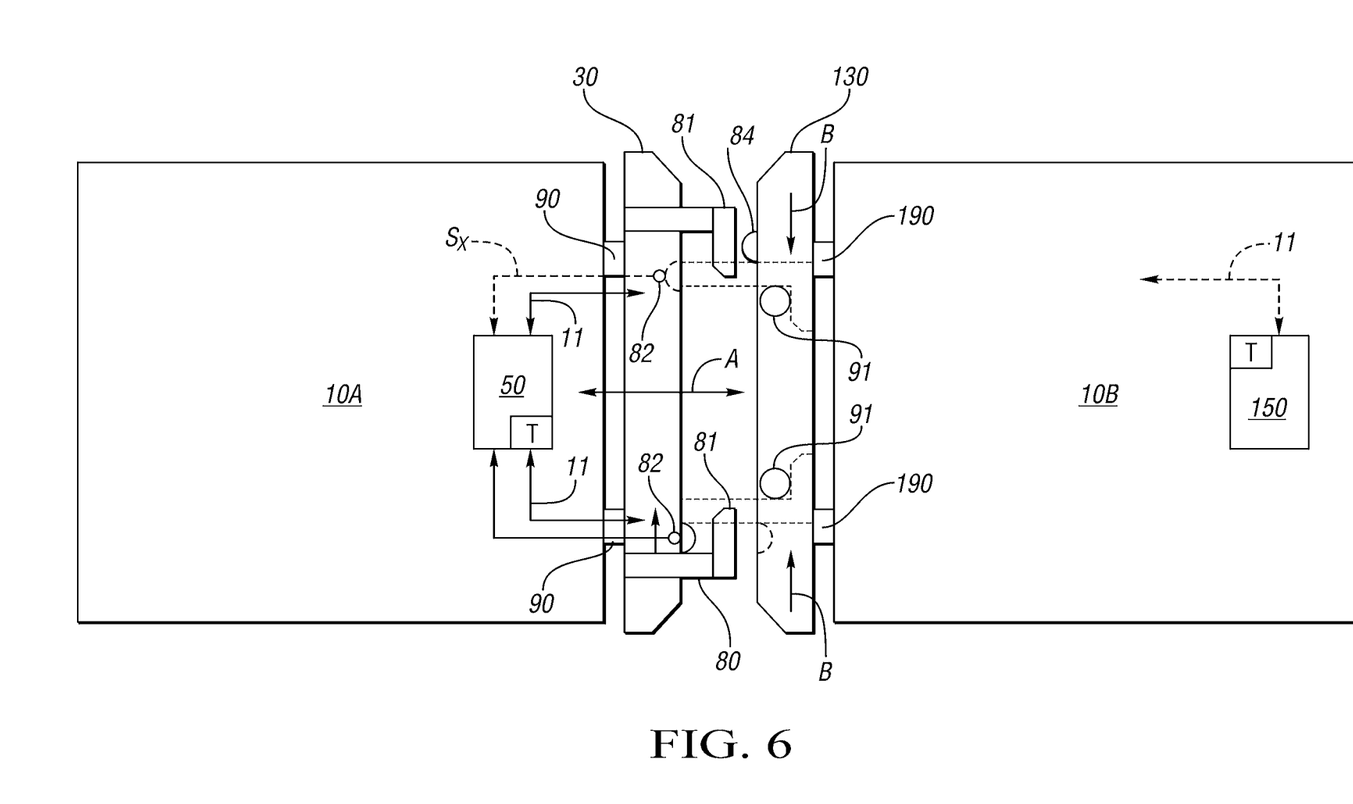
FIG. 6 is a schematic top view illustration of an optional vehicle docking approach that is usable with the example modular robotic vehicle shown in FIGS. 1-3.

Referring to FIG. 6, in a possible embodiment the bumpers 30 shown in FIGS. 1 and 3 may be configured to enable vehicle-to-vehicle docking. In this approach, one vehicle 10B, i.e., the trailing vehicle in this example, and another vehicle 10A, which is the lead vehicle, may approach each other as indicated by double-headed arrow A. The rear bumper 30 of vehicle 10A and the front bumper 130 of vehicle 10B may include alignment features 84 and 86, e.g., a respective convex and concave conical feature. The relative positions of alignment features 84 and 86 may be reversed on the front and rear bumpers 30 and 130 as shown, such that the alignment features 84 of bumpers 30 and 130 each engage an alignment feature 86 of the opposing bumper 30 or 130. The bumpers 30 and 130 may be connected to the chassis 12 of FIG. 3 via the flexible mounts 90 and 190, which allows some level of compliance in the bumpers 30 and 130 as the alignment features 84 and 86 are aligned by drivers of the vehicles 10A and 10B.

After successful engagement of the alignment features 84 and 86, a clamping mechanism such as a pair of axial arms 80 each with an orthogonally-arranged radial arm 81 may be locked with respect to a stationary feature 91, e.g., by directly engaging a recess, post, hook, etc. The clamped configuration is shown in phantom, with the stationary feature 91 possibly connected to or formed integrally with the bumper 130 of vehicle 10B. In such an embodiment, the arms 80 and 81 may be moveably attached to the bumper 30. In such an embodiment, the arms 80 and 81 may be manually or automatically moved into engagement with the stationary feature 91, such that vehicles 10A and 10B are securely locked together, much like a conventional trailer hitch, to form a daisy chain of docked vehicles.

The master controller 50 of the lead vehicle 10A may be programmed or otherwise configured to communicate with a contact sensor 82 that is positioned with respect to the alignment features 84 and 86. Signals (arrow $S_X$) from the contact sensors 82 automatically inform the master controller 50 that a successful engagement of the alignment features 84 and 86 of the opposing bumpers 30 and 130 has been completed, and thus a successful docking maneuver. Data communications are then established between the linked vehicles 10A and 10B, e.g., via a physical connection completed at docking or wirelessly depending on the embodiment. For the latter embodiment, the master controllers 50 of each vehicle 10A and 10B may be equipped with transceivers (T), which receive and transmit control signals (arrows 11) to establish communications with each other.

In another embodiment, docking of the vehicles 10A and 10B may be entirely wireless, i.e., without mechanical coupling of the vehicles 10A and 10B. In such an embodiment, the contact sensors 82 may be replaced with proximity sensors, such as RFID, infrared, laser, or other suitably configured remote sensing device. When close proximity of the trailing vehicle 10B is detected, motion control over the trailing vehicle 10B may be managed via the master controller 50 of the lead vehicle 10A. While powerflow between the vehicles 10A and 10B may be more limited in this example configuration, motion control may be maintained without contact between the vehicles 10A and 10B.

As noted above, the master controller 50 is programmed to execute a wide spectrum of different steering modes, including the two-wheel, four-wheel, diamond, and omni-directional or "crab mode" steering noted above. The modular design of the eModules 40 along with the distributed control network with the master controller 50 at its center, enables such flexibility. A driver, using the HMI screen 38 of FIG. 3 or other suitable input device such as a mode selector switch, can select the desired steering mode for a given drive situation.

When multiple vehicles are docked as shown in FIG. 6, the master controller 50 of the lead vehicle, i.e., of vehicle 10A, can optionally override the higher-level control functions of any trailing vehicles such as vehicle 10B, such that driver inputs from a trailing vehicle do not conflict with those originating from within the lead vehicle 10A. For example, the master controller 50 of the lead vehicle 10A may transmit a signal to the master controller 150 of the trailing vehicle 10B instructing the master controller 150 to perform local vehicular functions for the trailing vehicle 10B only in response to higher-level instructions from the master controller 50, thus temporarily ignoring any conflicting inputs received by the master controller 150 from its own driver input devices (not shown). In such an embodiment, the lead vehicle 10A may be provided with a suitable on-board generator to extend the range of the docked vehicles, such as an additional or larger engine, a fuel cell, or any other suitable energy device.

Additionally, the lead vehicle 10A, via its master controller 50, can manage the power flow for the vehicle 10A, the vehicle 10B, and any additional vehicles (not shown) connected in series behind vehicle 10B. As each vehicle in the chain is identically configured in this embodiment, a plurality of the ESS 24 and PEM 52 shown in FIG. 3 are available, as well as additional motors at the various drive wheels 18. All electrical circuitry and hardware resident within any of the trailing vehicles, after docking, is thus effectively treated by the master controller 50 of the lead vehicle 10A as a single suite of equipment, and the linked vehicles 10A and 10B as a single extended vehicle 10.

Therefore, propulsion and braking of the trailing vehicles via the eModules 40 (see FIG. 3) may be selectively enabled and disabled by the master controller 50 of vehicle 10A depending on the mode, such that the drive wheels 18 of the trailing vehicles are allowed to freewheel. In this instance, the electrical energy stored in the battery pack(s) 24 of the trailing vehicle 10B can be used to extend the EV range of the linked vehicles 10A and 10B. Other configurations may take advantage of any electrical generation capabilities of the motors within the drive wheels 18 to feed additional energy to the lead vehicle 10A as needed.

Using the vehicle 10 of FIGS. 1-3, independent drive-by-wire control is enabled over multiple steering, propulsion, and braking systems, all of which are housed within a corresponding eModule 40. The master controller 50 of FIG. 3 supervises the control of each eModule 40, and combines the eModules 40 into a cohesive system. Full control authority by the master controller 50 over the functions of each eModule 40 enhances the overall maneuverability of the vehicle 10. The vehicle 10 may be rapidly reconfigured via the quick-release attachment configuration described above with reference to FIGS. 4 and 5, e.g., with differently configured eModules 40 being installed to change the possible drive modes, e.g., with propulsion available only from two drives wheels 18 rather than four, or vice versa. Vehicle-to-vehicle linking, as shown in the example of FIG. 6, can be used to further enhance the drive capabilities.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A vehicle comprising:
   a chassis;
   a plurality of driver input devices;
   an energy storage system (ESS);
   at least one electronic modular assembly (eModule) that is electrically connected to the ESS, and that includes:
      a drive wheel containing a by-wire propulsion-braking module configured to selectively propel and brake the drive wheel;
      a mounting bracket covering a steering control assembly having at least one steering controller which controls a by-wire steering function of the vehicle; and
      a housing positioned adjacent to the mounting bracket, and containing a propulsion control assembly, a braking control assembly, and a spring-damper assembly, wherein the propulsion control assembly and the braking control assembly include a propulsion controller and a brake controller, respectively, which together control the by-wire propulsion-braking module; and
   a master controller in communication with the at least one steering controller, the propulsion controller, and the brake controller, and with the plurality of driver input devices, wherein the master controller is programmed to communicate with and independently control the at least one eModule to selectively establish one of a plurality of different operating modes in response to driver input commands from the plurality of driver input devices.

2. The vehicle of claim 1, wherein the at least one steering controller includes two steering controllers.

3. The vehicle of claim 1, wherein the plurality of different operating modes include a two-wheel steering mode, a four-wheel steering mode, a diamond steering mode, an omni-directional steering mode, and a park mode.

4. The vehicle of claim 1, wherein the at least one eModule includes an elongated C-shaped mounting hook which receives and engages a portion of the chassis.

5. The vehicle of claim 1, wherein the vehicle has four corners, and wherein the at least one eModule includes only two eModules.

6. The vehicle of claim 1, further comprising a bumper having a contact sensor in communication with the master controller, wherein the contact sensor is configured to detect a docking maneuver of the vehicle with an additional vehicle.

7. The vehicle of claim 6, further comprising an alignment feature that aligns the bumper of the vehicle with a bumper of the additional vehicle during the docking maneuver.

8. The vehicle of claim 7, further comprising a latching mechanism that locks the bumpers together after the docking maneuver.

9. The vehicle of claim 6, wherein the master controller is programmed to communicate with and independently control at least one eModule of the additional vehicle after the docking maneuver, including transmitting a signal that overrides independent control of the at least one eModule of the additional vehicle by a master controller of the additional vehicle.

10. The vehicle of claim 1, wherein the at least one eModule includes an angled bracket through which protrudes a power/communication connector delivering electrical power and data to the at least one eModule from the power electronics module and the master controller, respectively, and a pair of fluid ports delivering fluid to the braking module.

11. The vehicle of claim 1, wherein the chassis defines a plurality of storage cavities, and wherein at least one of the ESS, the master controller, and the PEM are positioned within a corresponding one of the storage cavities.

12. The vehicle of claim 1, wherein the plurality of driver input devices includes an accelerator pedal, a brake pedal, a human-machine interface (HMI) screen, and at least one of a steering wheel and a joystick.

13. The vehicle of claim 1, further comprising an electrical charging port that is connectable to an offboard power supply for recharging of the ESS.

14. A vehicle comprising:
a chassis having interconnected tubular frame pieces;
a plurality of driver input devices, including each of a steering wheel, a brake pedal, an accelerator pedal, and a human-machine interface screen;
a solid-cell DC energy storage system (ESS) having a voltage rating of at least 300 VDC;
an electrical charging port that is connectable to an offboard power supply for recharging the ESS;
a power electronics module (PEM) that is electrically connected to the ESS and operable to distribute power from the ESS;
a plurality of modular electronic assemblies (eModules), each of which is electrically connected to the ESS via the PEM, and each of which includes:
a drive wheel containing a by-wire propulsion-braking module configured to selectively propel and brake the drive wheel;
a housing containing a propulsion control assembly and a braking control assembly, wherein the propulsion control assembly and the braking control assembly include a propulsion controller and a brake controller, respectively, which together control the by-wire propulsion-braking module; and
a mounting bracket covering a steering control assembly having a pair of steering controllers which control a by-wire steering function of the vehicle; and
at least one master controller in communication with the pair of steering controllers, the propulsion controller, and the brake controller, and with each of the plurality of driver input devices, wherein the at least one master controller is programmed to communicate with and independently control each eModule via commands transmitted to the pair of steering controllers, the propulsion controller, and the brake controller, and to selectively establish one of a plurality of different operating modes selected from the group consisting essentially of a two-wheel steering mode, a four-wheel steering mode, a diamond steering mode, an omni-directional steering mode, and a park mode.

15. The vehicle of claim 14, further comprising a bumper that is flexibly connected to the chassis, wherein the bumper defines an alignment feature that aligns the bumper of the vehicle with a bumper of an additional vehicle.

16. The vehicle of claim 15, wherein the alignment feature includes a convex conical feature and a concave conical feature.

17. The vehicle of claim 16, further comprising a contact sensor that is positioned with respect to the alignment feature in communication with the master controller, wherein the contact sensor is configured to detect a docking maneuver of the vehicle with an additional vehicle and to signal the detected docking maneuver to the at least one master controller.

18. The vehicle of claim 14, wherein each of the eModules includes an angled bracket which frames and supports a set of fluid input/output connectors and a set of electrical/data connectors protruding from the angled bracket.

* * * * *